United States Patent
Lu et al.

(10) Patent No.: US 10,955,945 B2
(45) Date of Patent: Mar. 23, 2021

(54) PERIPHERAL DEVICE WITH ACCESSORY IDENTIFICATION CAPABILITY

(71) Applicants: DEXIN ELECTRONIC LTD., Guangdong (CN); DEXIN CORPORATION, New Taipei (TW)

(72) Inventors: Ho-Lung Lu, New Taipei (TW); Shu-Sheng Chen, New Taipei (TW)

(73) Assignees: DEXIN ELECTRONIC LTD., Guangdong (CN); DEXIN CORPORATION, New Taipei (TW)

( * ) Notice: Subject to any disclaimer, the term of this patent is extended or adjusted under 35 U.S.C. 154(b) by 0 days.

(21) Appl. No.: 16/690,135

(22) Filed: Nov. 21, 2019

(65) Prior Publication Data

US 2020/0241654 A1 Jul. 30, 2020

(30) Foreign Application Priority Data

Jan. 30, 2019 (TW) .................................. 108103553

(51) Int. Cl.
*G06F 3/039* (2013.01)
*G06F 3/02* (2006.01)
*G06F 3/0354* (2013.01)

(52) U.S. Cl.
CPC ............ *G06F 3/039* (2013.01); *G06F 3/0227* (2013.01); *G06F 3/03543* (2013.01)

(58) Field of Classification Search
CPC ..... G06F 3/0227; G06F 3/03543; G06F 3/039
See application file for complete search history.

(56) References Cited

U.S. PATENT DOCUMENTS

| | | | |
|---|---|---|---|
| 2002/0109960 A1* | 8/2002 | Liu ........................ | G06F 3/0224 361/600 |
| 2004/0189604 A1* | 9/2004 | Lee ...................... | G06F 3/03543 345/163 |
| 2005/0075172 A1* | 4/2005 | Coleman ................ | A63F 13/02 463/47 |
| 2005/0182857 A1* | 8/2005 | Kong .................... | G06F 3/0393 710/1 |
| 2005/0213302 A1* | 9/2005 | Lin ........................ | G06F 1/203 361/695 |
| 2006/0098397 A1* | 5/2006 | Chou .................... | G06F 3/0202 361/679.08 |
| 2006/0209026 A1* | 9/2006 | Balmes ................ | G06F 3/03543 345/163 |
| 2006/0250361 A1* | 11/2006 | Chang ................ | G06F 3/03543 345/163 |
| 2007/0091558 A1* | 4/2007 | Wang .................... | G06F 1/1616 361/679.57 |

(Continued)

*Primary Examiner* — Hong Zhou
(74) *Attorney, Agent, or Firm* — Li & Cai Intellectual Property Office

(57) ABSTRACT

A peripheral device with accessory identification capability includes a device body and at least one accessory. The device body includes a processing unit disposed therein. The at least one accessory is releasably attached to the device body and selectively coupled to the processing unit. When the at least one accessory is attached to the device body and coupled to the processing unit, the processing unit identifies the at least one accessory and instructs at least one function of the device body to be performed, based on at least one identification code of the identified at least one accessory.

3 Claims, 7 Drawing Sheets

(56) References Cited

U.S. PATENT DOCUMENTS

| | | | |
|---|---|---|---|
| 2012/0099755 A1* | 4/2012 | Hu | H04R 1/1066 381/380 |
| 2014/0267383 A1* | 9/2014 | Javidan | G06F 3/04845 345/619 |
| 2015/0104033 A1* | 4/2015 | Kulavik | H04R 1/1041 381/74 |
| 2016/0100238 A1* | 4/2016 | Broadley | H04R 1/1008 381/371 |
| 2017/0075438 A1* | 3/2017 | Chen | G06F 3/03543 |
| 2017/0220132 A1* | 8/2017 | O'Mahony | G06F 3/03543 |
| 2017/0361222 A1* | 12/2017 | Tsuchiya | A63F 13/24 |
| 2018/0239448 A1* | 8/2018 | Hong | G06F 3/03543 |

* cited by examiner

PERIPHERAL DEVICE WITH ACCESSORY IDENTIFICATION CAPABILITY

CROSS-REFERENCE TO RELATED PATENT APPLICATION

This application claims the benefit of priority to Taiwan Patent Application No. 108103553, filed on Jan. 30, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a peripheral device, in particular, to a peripheral device of a host (desktop computer/tablet computer/mobile phone) with accessory identification capability.

BACKGROUND OF THE DISCLOSURE

The conventional peripheral devices, computer mice for example, are already equipped with removable function modules, such as an optical sensor module, laser sensor module and so on, so that the computer mouse can have different functions according to the different removable function modules. However, the conventional peripheral devices neither identify the removable decorative accessories thereof, such as different decorative cases, nor do they perform the corresponding functions of identified accessories.

SUMMARY OF THE DISCLOSURE

One of the objectives of the present disclosure is to provide a peripheral device with accessory identification capability that can overcome the aforementioned issues.

In one aspect, the present disclosure provides a peripheral device with accessory identification capability, including a device body and at least one accessory. The device body includes a processing unit disposed therein. The at least one accessory is releasably attached to the outer surface of the device body and selectively coupled to the processing unit. When the at least one accessory is attached to the device body and coupled to the processing unit, the processing unit identifies the at least one accessory and instructs at least one function of the device body to be performed, based on at least one identification code of the identified at least one accessory.

In certain embodiments, the processing unit outputs the at least one identification code of the identified at least one accessory to a host, and the host instructs at least one function thereof to be performed, based on the at least one identification code of the identified at least one accessory.

In certain embodiments, the device body is a mouse body, the at least one accessory includes a first accessory and a second accessory, the first accessory is a button decorative member adaptable for left-handed users, and the second accessory is a button decorative member adaptable for right-handed users. When the first accessory is attached to the device body and coupled to the processing unit, the processing unit identifies the first accessory and instructs the device body to change its current operation mode to a left-hand operation mode, based on an identification code of the first accessory. When the second accessory is attached to the device body and coupled to the processing unit, the processing unit identifies the second accessory and instructs the device body to change its current operation mode to a right-hand operation mode, based on an identification code of the second accessory.

In certain embodiments, the at least one accessory further includes a third accessory and a fourth accessory, the third accessory is a decorative case, and the fourth accessory is another decorative case. When the third accessory is attached to the device body and coupled to the processing unit, the processing unit identifies the third accessory and instructs the device body to emit light of a first color, based on an identification code of the third accessory. When the fourth accessory is attached to the device body and coupled to the processing unit, the processing unit identifies the fourth accessory and instructs the device body to emit light of a second color, based on an identification code of the fourth accessory.

In certain embodiments, when the third accessory is attached to the device body, the host instructs an operation interface of the host to change its interface color to match the first color, based on the identification code of the third accessory. When the fourth accessory is attached to the device body, the host instructs the operation interface of the host to change its interface color to match the second color, based on the identification code of the fourth accessory.

In certain embodiments, the device body is a keyboard body, the at least one accessory includes a first accessory and a second accessory, the first accessory is a keyboard decorative member, and the second accessory is another keyboard decorative member. When the first accessory is attached to the device body and coupled to the processing unit, the processing unit identifies the first accessory and instructs the device body to emit light of a first color, based on an identification code of the first accessory. When the second accessory is attached to the device body and coupled to the processing unit, the processing unit identifies the second accessory and instructs the device body to emit light of a second color, based on an identification code of the second accessory.

In certain embodiments, when the first accessory is attached to the device body, the host instructs an operation interface of the host to change its interface color to match the first color, based on the identification code of the first accessory. When the second accessory is attached to the device body, the host instructs the operation interface of the host to change its interface color to match the second color, based on the identification code of the second accessory.

In certain embodiments, the device body is a gamepad body, the at least one accessory includes a first accessory and a second accessory, the first accessory is a handgrip decorative member, and the second accessory is another handgrip decorative member. When the first accessory is attached to the device body and coupled to the processing unit, the processing unit identifies the first accessory and instructs the device body to emit light of a first color, based on an identification code of the first accessory. When the second accessory is attached to the device body and coupled to the processing unit, the processing unit identifies the second accessory and instructs the device body to emit light of a second color, based on an identification code of the second accessory.

In certain embodiments, the device body is a headset body, the at least one accessory includes a first accessory and a second accessory, the first accessory is a headset decorative plate, and the second accessory is another headset decorative plate. When the first accessory is attached to the device body and coupled to the processing unit, the processing unit identifies the first accessory and instructs the device body to emit light of a first color, based on an identification code of the first accessory. When the second accessory is attached to the device body and coupled to the processing unit, the processing unit identifies the second accessory and instructs the device body to emit light of a second color, based on an identification code of the second accessory.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
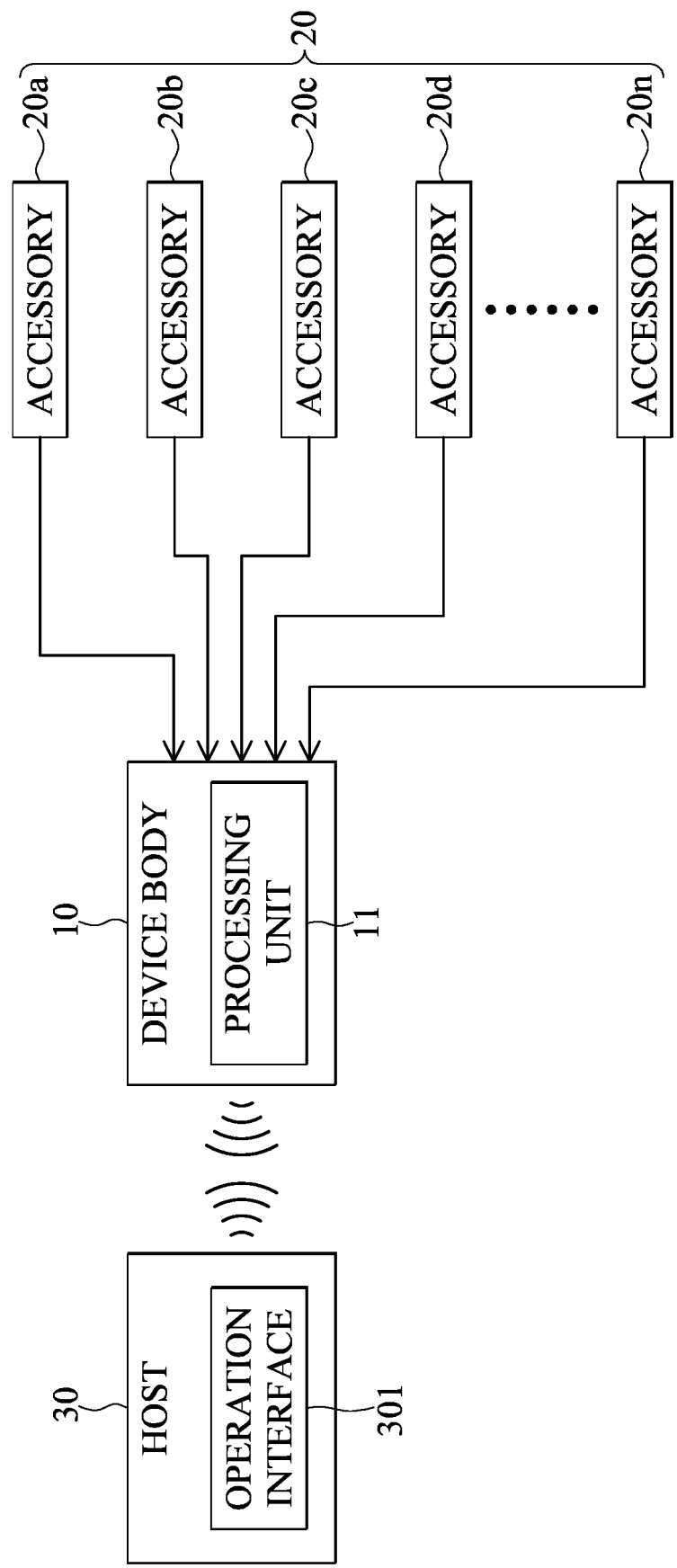
FIG. 1 is a functional block diagram of a peripheral device of a host of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
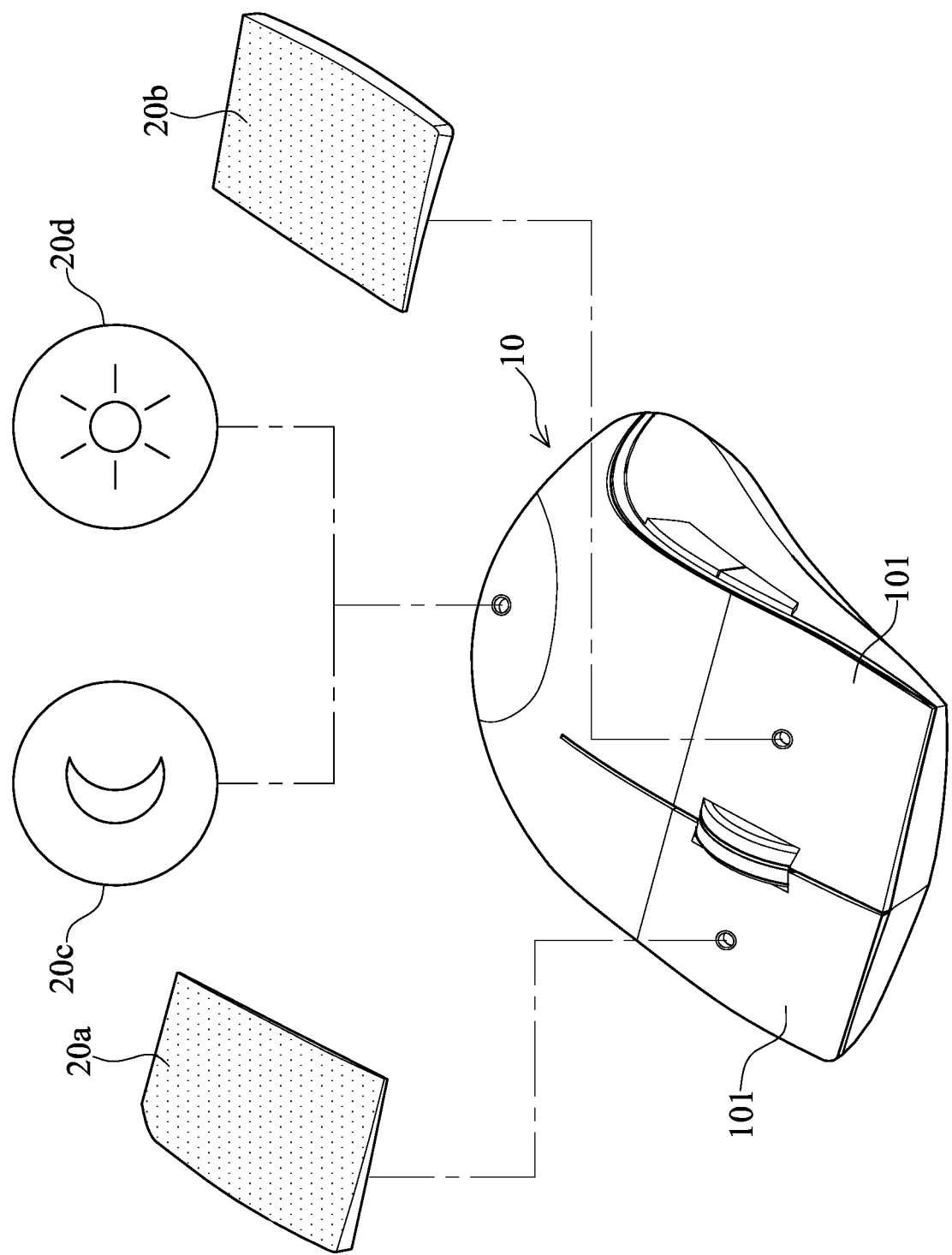
FIG. 2 is a partial exploded view of a peripheral device of a first embodiment of the present disclosure.

Referring to FIG. 1, there is shown a functional block diagram of the present disclosure. Referring to FIG. 2, there is shown a peripheral device with accessory identification capability (hereinafter referred to as the peripheral device) of the present embodiment using mouse as an example. However, the peripheral device is not limited to being a mouse, and may be other peripheral devices such as a keyboard, a headset, a gamepad, and so on.

The peripheral device of the present embodiment includes a device body 10 and at least one accessory 20. The device body 10 of the present embodiment is a mouse body with complete mouse functions. The device body 10 may include a processing unit 11 disposed inside the device body 10. There may be more than one of the at least one accessory 20, for example, from accessory 20a to accessory 20n, and the quantity of accessory 20 is not limited. In the present embodiment, there are four accessories 20: accessory 20a, accessory 20b, accessory 20c, and accessory 20d. The accessories 20 are decorative members used to change the appearance of the peripheral device through replacement, and are not functional modules. When the accessories 20 are attached to the device body 10, the processing unit 11 of the device body 10 can identify the accessories 20 based on identification codes of the accessories 20, as well as instruct the corresponding function(s) of the device body 10 to be performed based on the accessories 20 identified. In addition, the processing unit 11 of the device body 10 can send the identification codes of the identified accessories 20 to the host 30, so that the host 30 can determine which function(s) to perform based on the identification codes of the accessories 20. In practice, the identification code of the accessory 20 may be the preset resistance value of the accessory 20 or the code pre-stored in an EEPROM memory of the accessory 20, but is not limited thereto.

Figure 3:
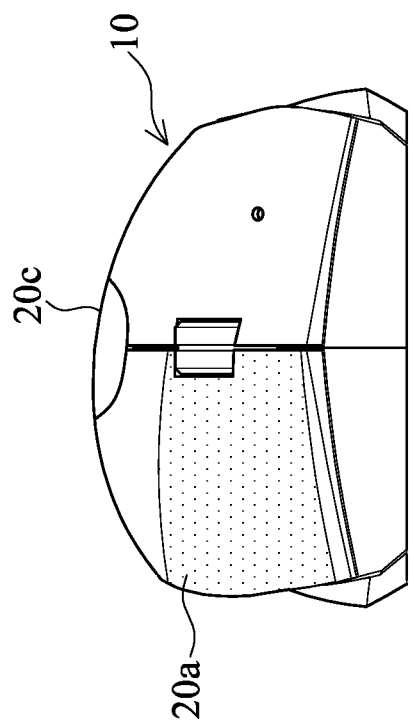
FIG. 3 is a front view of a peripheral device of the first embodiment of the present disclosure.

For example, the accessory 20a shown in FIG. 2 and FIG. 3 is a button decorative member, which can be used by left-handed users and may be releasably attached to the button 101 of the device body 10 and selectively coupled to the processing unit 11. When the accessory 20a is attached to the device body 10, the processing unit 11 of the device body 10 can identify the accessory 20a based on its identification code, as well as instruct the device body 10 to change its current operation mode to a left-hand operation mode. Furthermore, the processing unit 11 of device body 10 can also send the identification code of the accessory 20a to the host 30 (such as a desktop computer/tablet computer/mobile phone) in a wired or wireless manner and let the host 30 determine which function to perform, such as changing the operation interface 301 of the host 30 to a left-handed operation interface that is suitable to left-handed users.

Figure 4:
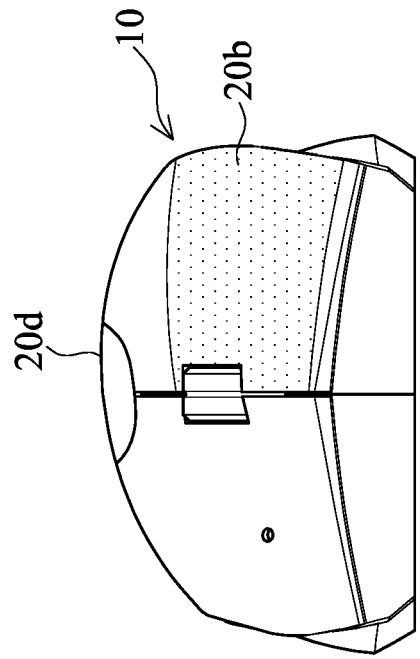
FIG. 4 is another front view of a peripheral device of the first embodiment of the present disclosure.

For example, the accessory 20b shown in FIG. 2 and FIG. 4 is another type of button decorative member, which can be used by right-handed users and may be releasably attached to the button 101 of the device body 10 and selectively coupled to the processing unit 11. When the accessory 20b is attached to the device body 10, the processing unit 11 of the device body 10 can identify the accessory 20b based on its identification code, as well as instruct the device body 10 to change its current operation mode to a right-hand operation mode. Furthermore, the processing unit 11 of device body 10 can also send the identification code of the accessory 20b to the host 30 in a wired or wireless manner and let the host 30 determine which function to perform, such as changing the operation interface 301 of the host 30 to a right-handed operation interface that is suitable to right-handed users.

For example, the accessory 20c shown in FIG. 2 and FIG. 3 is a decorative case with moon pattern. When the accessory 20c is attached to the outer surface of the device body 10 and coupled to the processing unit 11, the processing unit 11 of the device body 10 can identify the accessory 20c based on its identification code, as well as instruct the device body 10 to perform the corresponding function, such as instructing the device body 10 to emit light of a first color (i.e. blue) by LEDs inside. Furthermore, the processing unit 11 of device body 10 can also send the identification code of accessory 20c to the host 30 and let the host 30 determine which function to perform. For example, the host 30 can instruct the operation interface 301 thereof to change its interface color to match the first color (blue) and/or execute a corresponding application.

For example, the accessory 20d shown in FIG. 2 and FIG. 4 is another type of decorative case with sun pattern. When the accessory 20d is attached to the outer surface of the device body 10 and coupled to the processing unit 11, the processing unit 11 of the device body 10 can identify the accessory 20d based on its identification code, as well as instruct the device body 10 to perform the corresponding function, such as instructing the device body 10 to emit light of a second color (i.e. green) by LEDs inside. Furthermore, the processing unit 11 of the device body 10 can also send the identification code of the accessory 20d to the host 30 and let the host 30 determine which function to perform. For example, the host 30 can instruct the operation interface 301 thereof to change its interface color to match the second color (green) and/or execute a corresponding application.

Therefore, the accessory 20a, accessory 20b, accessory 20c, or the accessory 20d can be individually attached to the device body 10, or the accessory 20a and accessory 20c can both be attached to the device body 10, or the accessory 20b and accessory 20d can both be attached to the device body 10, so that the device body 10 can change its function based on the attached single accessory or multiple accessories, or let the host 30 determine which function to perform.

Second Embodiment

Figure 5:
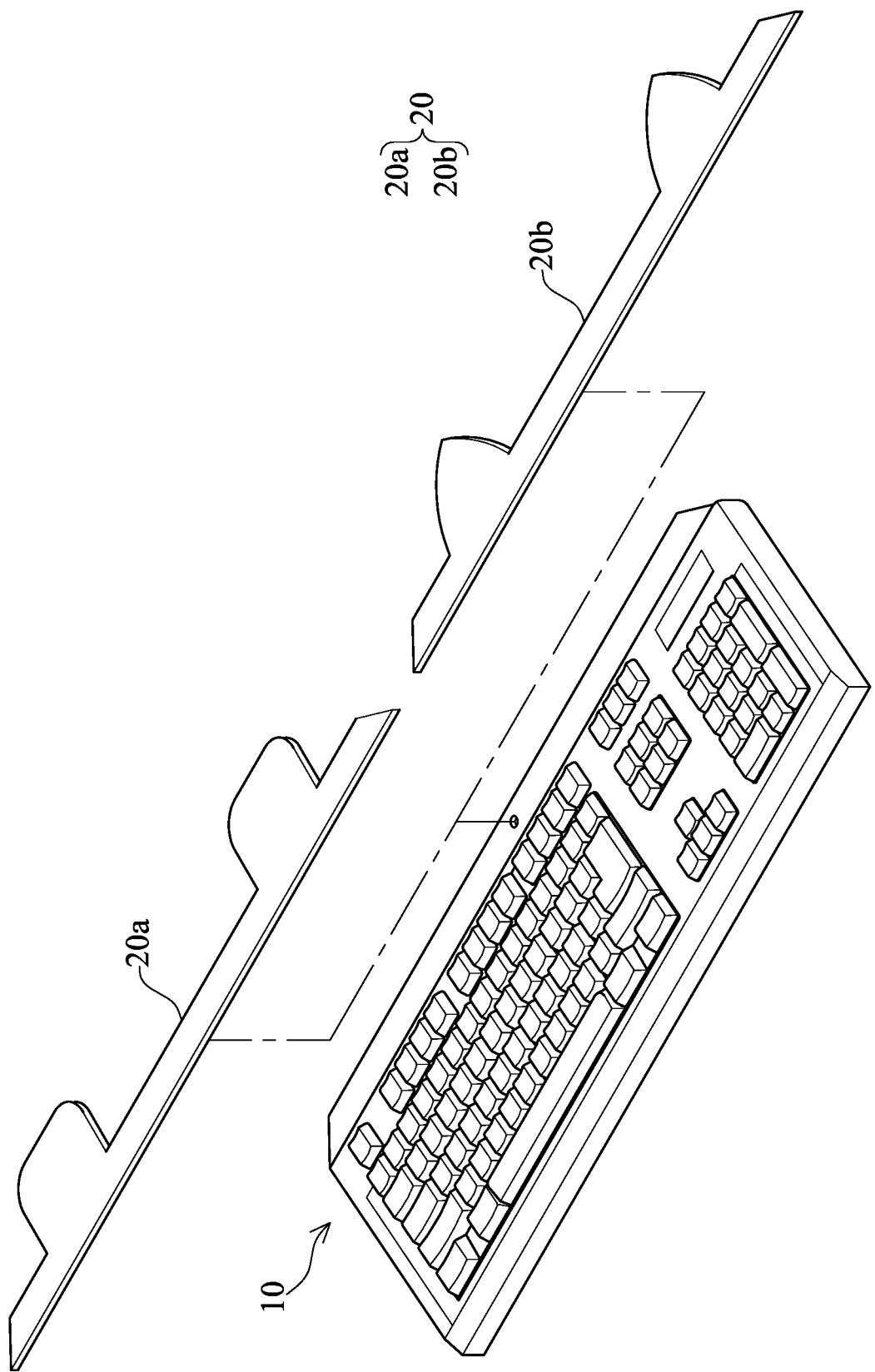
FIG. 5 is a partial exploded view of a peripheral device of a second embodiment of the present disclosure.

Referring to FIG. 5, there is shown a peripheral device with accessory identification capability (hereinafter referred to as the peripheral device) of the present embodiment using keyboard as an example.

Referring to both FIG. 1 and FIG. 5, the peripheral device of the present embodiment includes a device body 10 and at least one accessory 20. The device body 10 of the present embodiment is a keyboard body with complete keyboard functions. The device body 10 may include a processing unit 11 disposed inside the device body 10. In the present embodiment, there are two types of accessories: accessory 20a and accessory 20b. It should be noted that the accessory 20 may include only one accessory or multiple accessories, the quantity of which is not limited.

The accessory 20a can be, for example, a keyboard decorative member, which may be releasably attached to the device body 10 and selectively coupled to the processing unit 11. When the accessory 20a is attached to the device body 10, the processing unit 11 of the device body 10 can identify the accessory 20a based on its identification code, as well as instruct the device body 10 to perform the corresponding function, such as instructing the device body 10 to emit light of a first color. Furthermore, the processing unit 11 of the device body 10 can also send the identification code of accessory 20a to the host 30 and let the host 30 determine which function to perform. For example, the host 30 can instruct the operation interface 301 thereof to change its interface color to match the first color and/or execute a corresponding application.

The accessory 20b can be, for example, another type of keyboard decorative member, which may be releasably attached to the device body 10 and selectively coupled to the processing unit 11. When the accessory 20b is attached to the device body 10, the processing unit 11 of the device body 10 can identify the accessory 20b based on its identification code, as well as instruct the device body 10 to perform the corresponding function, such as instructing the device body 10 to emit light of a second color. Furthermore, the processing unit 11 of device body 10 can also send the identification code of accessory 20b to the host 30 and let the host 30 determine which function to perform. For example, the host 30 can instruct the operation interface 301 thereof to change its interface color to match the second color and/or execute a corresponding application.

Third Embodiment

Figure 6:
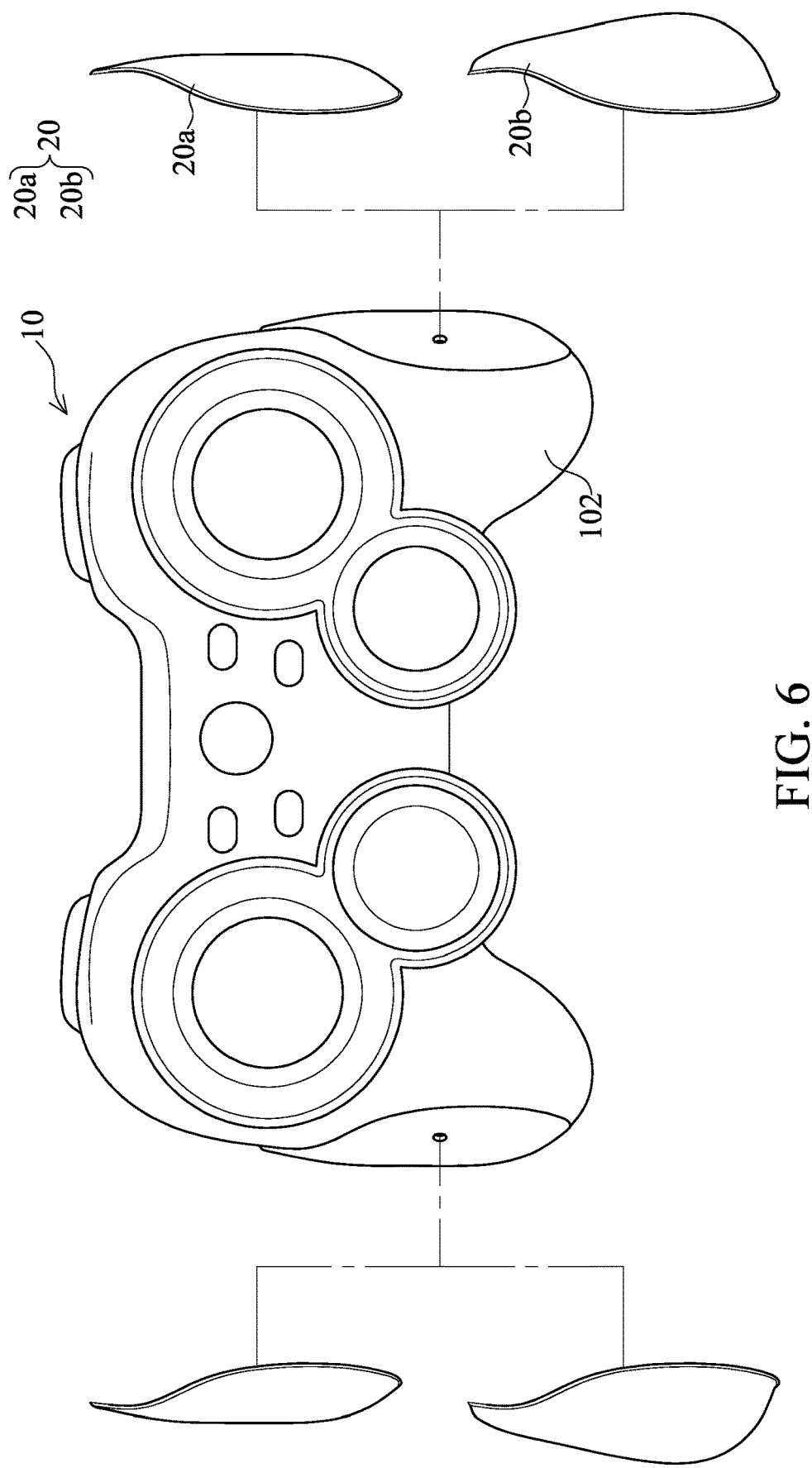
FIG. 6 is a partial exploded view of a peripheral device of a third embodiment of the present disclosure.

Referring to FIG. 6, there is shown a peripheral device with accessory identification capability (hereinafter referred to as the peripheral device) of the present embodiment using gamepad as an example.

Referring to both FIG. 1 and FIG. 6, the peripheral device of the present embodiment includes a device body 10 and at least one accessory 20. The device body 10 of the present embodiment is a gamepad body with complete gamepad functions. The device body 10 may include a processing unit 11 disposed inside the device body 10. In the present embodiment, there are two types of accessories: accessory 20a and accessory 20b. It should be noted that the accessory 20 may include only one accessory or multiple accessories, the quantity of which is not limited.

The accessory 20a can be, for example, a pair of handgrip decorative members, which may be releasably attached to a pair of handgrips 102 of the device body 10 and selectively coupled to the processing unit 11. When the accessory 20a is attached to the device body 10, the processing unit 11 of the device body 10 can identify the accessory 20a based on its identification code, as well as instruct the device body 10 to perform the corresponding function, such as instructing the device body 10 to emit light of a first color. Furthermore, the processing unit 11 of device body 10 can also output the identification code of accessory 20a to the host 30 and let the host 30 determine which function to perform. For example, the host 30 can instruct the operation interface 301 thereof to change its interface color to match the first color and/or execute a corresponding application.

The accessory 20b can be, for example, another type of handgrip decorative members, which may be releasably attached to a pair of handgrip 102 of the device body 10 and selectively coupled to the processing unit 11. When the accessory 20b is attached to the device body 10, the processing unit 11 of the device body 10 can identify the accessory 20b based on its identification code, as well as instruct the device body 10 to perform the corresponding function, such as instructing the device body 10 to emit light of a second color. Furthermore, the processing unit 11 of device body 10 can also output the identification code of accessory 20b to the host 30 and let the host 30 determine which function to perform. For example, the host 30 can instruct the operation interface 301 thereof to change its interface color to match the second color and/or execute a corresponding application.

Fourth Embodiment

Figure 7:
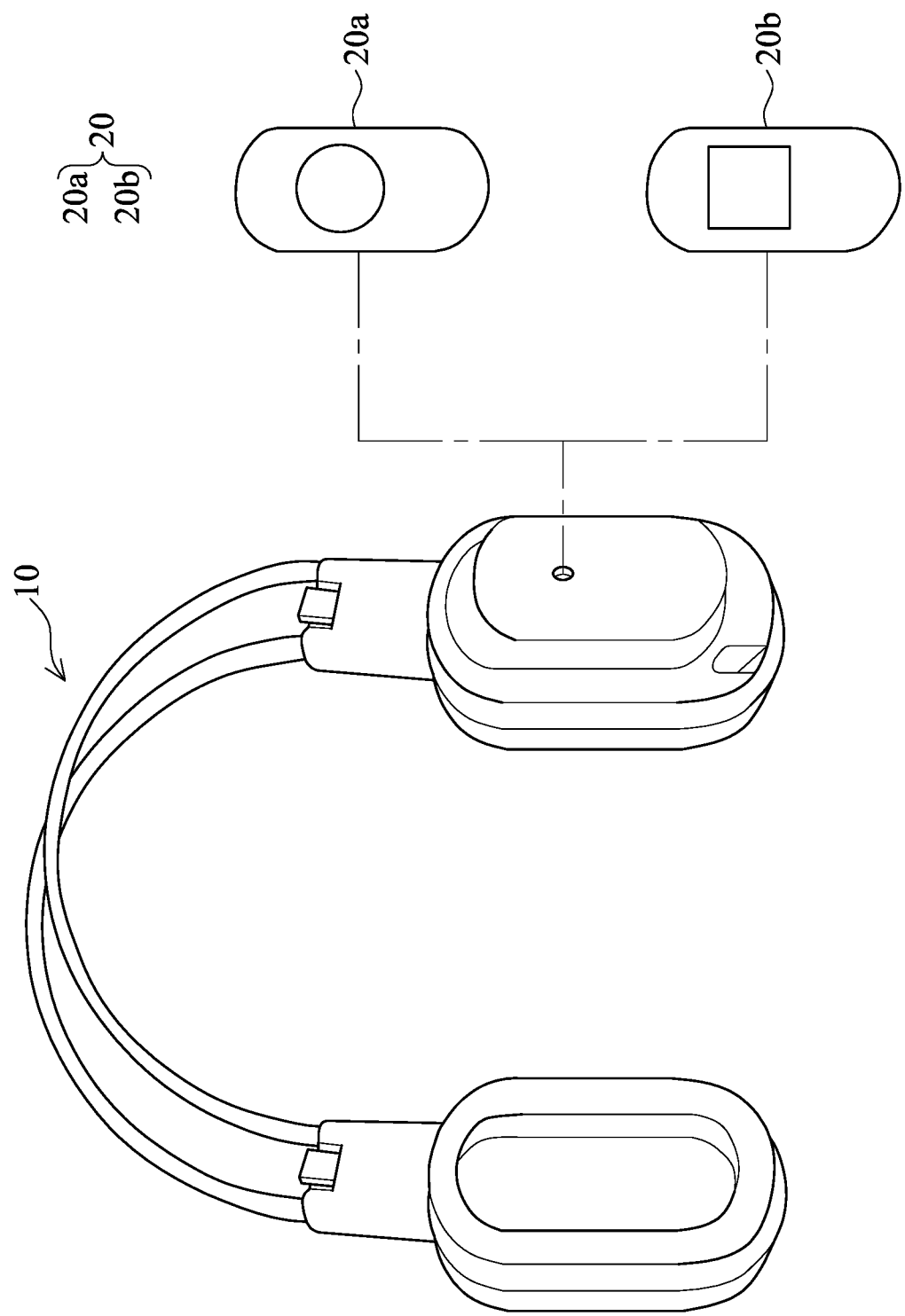
FIG. 7 is a partial exploded view of a peripheral device of a fourth embodiment of the present disclosure.

Referring to FIG. 7, there is shown a peripheral device with accessory identification capability (hereinafter referred to as the peripheral device) of the present embodiment using headset as an example.

Referring to both FIG. 1 and FIG. 7, the peripheral device of the present embodiment includes a device body 10 and at least one accessory 20. The device body 10 of the present embodiment is a headset body with complete headset functions. The device body 10 may include a processing unit 11 disposed inside the device body 10. In the present embodiment, there are two types of accessories: accessory 20a and accessory 20b. It should be noted that the accessory 20 may include only one accessory or multiple accessories, the quantity of which is not limited.

The accessory 20a can be, for example, a headset decorative plate, which may be releasably attached to the device body 10 and selectively coupled to the processing unit 11. When the accessory 20a is attached to the device body 10, the processing unit 11 of the device body 10 can identify the accessory 20a based on its identification code, as well as instruct the device body 10 to perform the corresponding function, such as instructing the device body 10 to emit light of a first color. Furthermore, the processing unit 11 of device body 10 can also output the identification code of accessory 20a to the host 30 and let the host 30 determine which function to perform. For example, the host 30 can instruct the operation interface 301 thereof to change its interface color to match the first color and/or execute a corresponding application.

The accessory 20b can be, for example, another type of headset decorative plate, which may be releasably attached to the device body 10 and selectively coupled to the processing unit 11. When the accessory 20b is attached to the device body 10, the processing unit 11 of the device body 10 can identify the accessory 20b based on its identification code, as well as instruct the device body 10 to perform the corresponding function, such as instructing the device body 10 to emit light of a second color. Furthermore, the processing unit 11 of device body 10 can also report the identification code of accessory 20b to the host 30 and let the host 30 determine which function to perform. For example, the host 30 can command the operation interface 301 thereof to change its interface color to match the second color and/or execute a corresponding application.

Fifth Embodiment

Figure 8:
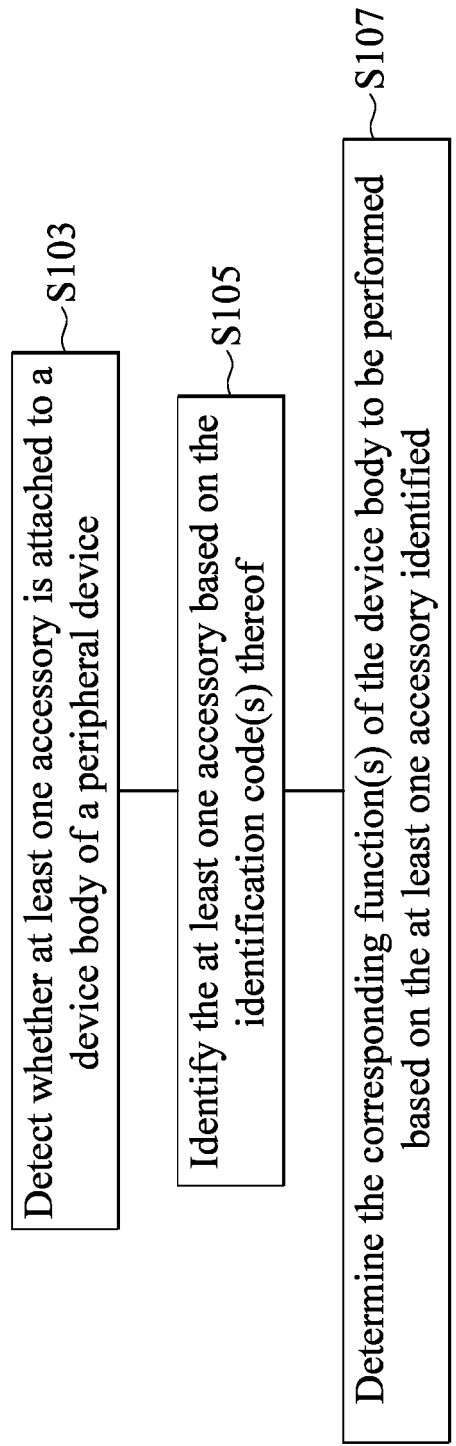
FIG. 8 is a schematic flow chart diagram illustrating a method of the present disclosure.

From the above embodiments, the peripheral device of the present disclosure can be implemented with a method for identifying the accessories and controlling the peripheral device, and the schematic flow chart thereof is as shown in FIG. 8, with further reference to FIG. 1. Firstly, in step S103, whether at least one accessory 20 is attached to the device body 10 of a peripheral device is detected. Assuming that it is confirmed in the step S103 that at least one accessory 20 is attached to the device body 10 of the peripheral device, in step S105, at least one accessory 20 is identified based on the identification code(s) thereof. Finally, in step S107, the device body 10 of the peripheral device is commanded to perform the corresponding function(s) based on the identification code(s) of the at least one accessory 20.

In summary, the peripheral device with accessory identification capability provided by the present disclosure can identify at least one accessory according to the identification code thereof and perform the corresponding function(s) according to the one accessory or multiple accessories identified. Furthermore, the peripheral device with accessory identification capability provided by the present disclosure can also output the identified identification code(s) of at least one accessory to a host, so that the host can determine which function(s) to be performed based on the identification code(s) of at least one accessory identified.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A peripheral device with accessory identification capability, comprising:
a device body including a processing unit disposed therein; and
at least one accessory releasably attached to an outer surface of the device body and selectively coupled to the processing unit;
wherein, when the at least one accessory is attached to the outer surface of the device body and coupled to the processing unit, the processing unit identifies the at least one accessory and instructs at least one function of the device body to be performed, based on at least one identification code of the identified at least one accessory;
wherein the processing unit further outputs the at least one identification code of the identified at least one accessory to a host, and the host instructs at least one function thereof to be performed, based on the at least one identification code of the identified at least one accessory;
wherein the device body is a mouse body, the at least one accessory includes a first accessory and a second accessory, the first accessory is a button decorative member adaptable for left-handed users, and the second accessory is a button decorative member adaptable for right-handed users; wherein, when the first accessory is attached to the device body and coupled to the processing unit, the processing unit identifies the first accessory and instructs the device body to change its current operation mode to a left-hand operation mode, based on an identification code of the first accessory; and wherein, when the second accessory is attached to the device body and coupled to the processing unit, the processing unit identifies the second accessory and instructs the device body to change its current operation mode to a right-hand operation mode, based on an identification code of the second accessory;

wherein the at least one accessory further includes a third accessory and a fourth accessory, the third accessory is a decorative case with a first decorative pattern, and the fourth accessory is another decorative case with a second decorative pattern; wherein, when the third accessory is attached to the device body and coupled to the processing unit, the processing unit identifies the third accessory and instructs the device body to emit light of a first color, based on an identification code of the third accessory; and wherein, when the fourth accessory is attached to the device body and coupled to the processing unit, the processing unit identifies the fourth accessory and instructs the device body to emit light of a second color, based on an identification code of the fourth accessory.

2. The peripheral device according to claim 1, wherein the third accessory is the decorative case with a moon-like pattern, and the fourth accessory is the decorative case with a sun-like pattern.

3. The peripheral device according to claim 2, wherein the processing unit identifies the third accessory and instructs the device body to emit blue light when the third accessory is attached to the device body and coupled to the processing unit, and the processing unit identifies the fourth accessory and instructs the device body to emit green light when the fourth accessory is attached to the device body and coupled to the processing unit.

* * * * *